(12) United States Patent
Colman et al.

(10) Patent No.: US 9,945,156 B2
(45) Date of Patent: Apr. 17, 2018

(54) ANTENNA AND WIRELESS DEADBOLT SENSOR

(71) Applicant: THOMSON LICENSING, Issy les Moulineaux (FR)

(72) Inventors: Gerald A. Colman, Indianapolis, IN (US); Girish Naganathan, Fishers, IN (US); Sin Hui Cheah, Carmel, IN (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 15/305,901

(22) PCT Filed: Apr. 29, 2015

(86) PCT No.: PCT/US2015/028168
§ 371 (c)(1),
(2) Date: Oct. 21, 2016

(87) PCT Pub. No.: WO2015/171380
PCT Pub. Date: Nov. 12, 2015

(65) Prior Publication Data
US 2017/0044797 A1 Feb. 16, 2017

Related U.S. Application Data

(60) Provisional application No. 61/989,578, filed on May 7, 2014.

(51) Int. Cl.
E05B 47/00 (2006.01)
E05B 17/22 (2006.01)
(Continued)

(52) U.S. Cl.
CPC .............. E05B 47/00 (2013.01); E05B 17/22 (2013.01); E05B 39/00 (2013.01); E05B 45/083 (2013.01);
(Continued)

(58) Field of Classification Search
None
See application file for complete search history.

(56) References Cited

U.S. PATENT DOCUMENTS 6,337,663 B1 * 1/2002 Chi-Ming .............. H01Q 1/243
343/700 MS
8,766,858 B2 7/2014 Li et al.
(Continued)

FOREIGN PATENT DOCUMENTS

CN 202949413 5/2013
GB 2495848 * 4/2013 .............. G07C 9/00
WO WO2003075401 9/2003

OTHER PUBLICATIONS

International Search Report of PCT/US2015/028168 dated Jul. 23, 2015.
(Continued)

Primary Examiner — Leon-Viet Nguyen
(74) Attorney, Agent, or Firm — Brian J. Dorini; Robert D. Shedd

(57) ABSTRACT

An antenna for reception and transmission of signals within an enclosure. The antenna includes a first lead for connection to a printed circuit board and a second lead. A plurality of vertical members extend in parallel to one another and spaced a predetermined distance apart. Each vertical member has a first end and a second end. A plurality of horizontal members is provided. Each horizontal member extends alternately between first ends of a pair of adjacent vertical members and second ends of a next pair of adjacent vertical members forming a connection between said first lead and said second lead.

10 Claims, 10 Drawing Sheets

(51) Int. Cl.
| | |
|---|---|
| E05B 45/08 | (2006.01) |
| H01Q 1/38 | (2006.01) |
| H01Q 9/26 | (2006.01) |
| H01Q 1/44 | (2006.01) |
| E05B 39/00 | (2006.01) |
| G07C 9/00 | (2006.01) |
| H04W 4/00 | (2018.01) |

(52) U.S. Cl.
CPC ........... *G07C 9/00309* (2013.01); *H01Q 1/38* (2013.01); *H01Q 1/44* (2013.01); *H01Q 9/26* (2013.01); *E05B 2047/0069* (2013.01); *G07C 2009/00769* (2013.01); *H04W 4/008* (2013.01)

(56) References Cited

U.S. PATENT DOCUMENTS

| | | |
|---|---|---|
| 8,773,313 B2 | 7/2014 | Xu et al. |
| 2005/0044908 A1* | 3/2005 | Min .................... E05B 47/0012 70/276 |
| 2005/0237255 A1 | 10/2005 | Zhang et al. |
| 2010/0102907 A1 | 4/2010 | Schebel et al. |

OTHER PUBLICATIONS

Griffin, Joshua David, "A Radio Assay for the Study of Radio Frequency Tag Antenna Performance", A Thesis Presented to the Academic Faculty, School of Electrical and Computer Engineering, Georgia Institute of Technology, Aug. 2005.

* cited by examiner

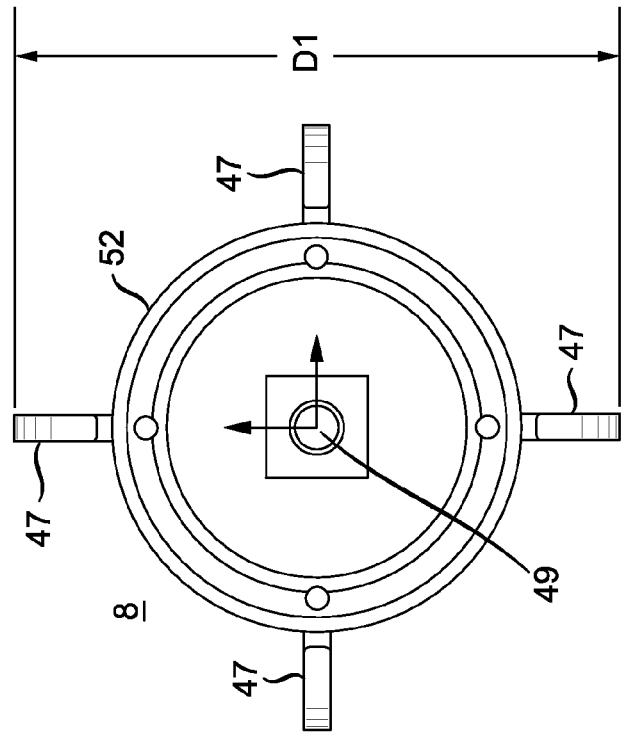
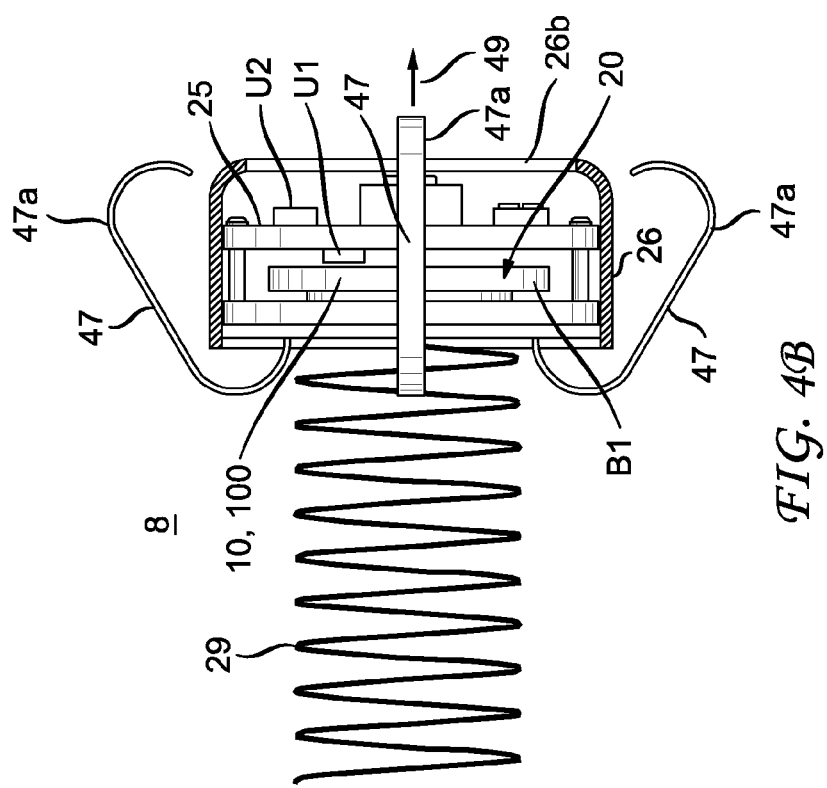

ANTENNA AND WIRELESS DEADBOLT SENSOR

CROSS REFERENCES

This application claims priority to a U.S. Provisional Application, Ser. No. 61/989,578, filed on May 7, 2014, which is herein incorporated by reference in its entirety.

This application claims the benefit, under 35 U.S.C. § 365 of International Application PCT/US2015/028168 filed Apr. 29, 2015 which was published in accordance with PCT Article 21(2) on Nov. 12, 2015 in English.

FIELD OF THE INVENTION

An antenna which can operate in a constrained or compact enclosure.

BACKGROUND OF THE INVENTION

Many devices operate within a constrained or compact enclosure from which a user may need to obtain information regarding the operation of the device. Without the ability to obtain information directly from the device inside the enclosure, it is necessary to have the information transmitted to the user or at times to transmit data to the device. It is also desirable for the user to be able to monitor and/or control the operation of the device from a remote location. Without remote monitoring capability, a user may not have the ability to monitor and/or control the operation of the device.

Conventional methods of monitoring activity within such a constrained or compact enclosure have only allowed for the use of a chip antenna or a physically short antenna that is not tuned to a desired frequency.

An advantageous antenna would be formed as one of a dipole or monopole and be raised away from a printed circuit board allowing for improved transmission and reception of signals over conventional chip antennas.

Advantageously, the antenna would be able to receive and transmit signals from within the enclosure enabling a user to securely and remotely query the status of a device within the enclosure, for example, a property entrance-door deadbolt lock, a set top box, a gateway, etc., using, for example, a cell phone that can be located substantially anywhere in the world without a need to subscribe to a commercial security service. A remotely situated user using conventional Application software (Apps) for Windows, Android, or iOS is able to receive the status or operational parameters of the device, for example by detecting when a deadbolt lock is engaged in a door frame or when it is retracted from the door frame based on a queried command, detecting a status of a set top box or remotely programming the set top box to record a program, etc. The queried command may be applied by wireless communication via a Graphical User Interface installed on a Smartphone or Personal Computer such as a Laptop, Desktop, or Notepad that may be located in the vicinity of the device or at a remote location that may be far from the device. Additionally, the sensor may be used in a variety of Home Automation applications. The sensor has a unique advantage of being lower in cost and providing better performance than chip antennas and also allows for use in very small spaces.

In a further advantageous feature, the antenna can be employed in any Wi-Fi, ZigBee or Bluetooth application. Further, the antenna can be employed in any number of devices where it would operate in a constrained enclosure such as a set-top box or gateway. In a further exemplary use, when used with a deadbolt sensor, the antenna can be used to receive command signals for remotely locking and unlocking, e.g. activating and deactivating, the deadbolt lock.

For example, when operating with a device in an enclosure, the antenna may be connected to a wireless transceiver/transmitter. Responsive to output signals such as from a sensor, the wireless transceiver/transmitter may periodically transmit a first wireless signal via the antenna conforming to a Bluetooth Low Energy (BLE) protocol that may contain information derived from the output signal. A BLE-ZigBee bridge device responsive to the BLE wireless signal may periodically store information related to the device. The bridge device may additionally be responsive to a second wireless signal conforming to the ZigBee protocol containing a request for information. The bridge device may transmit stored information using a third wireless signal conforming to the ZigBee protocol at a power level that is higher than a power level of the first wireless signal. The third wireless signal may be applied to a gateway device that conveys the stored information via the antenna to, for example, a remote user via, for example, a wide area network such as the Internet.

Advantageously, the antenna, the sensor, the BLE wireless transceiver and a battery that energizes the BLE wireless transceiver are installed together as a single unit that is inserted into a compact enclosure. They may also be displaced together, during operation, as a single unit in the enclosure.

Advantageously, reliability of the device may be improved by informing the user of any malfunction by providing error detection capability that includes redundancy, transmitting a signal indicative of the error detection using the antenna. The antenna improves the transmission and reception of signals by the device by increasing the transmission range, allowing for operation as either a monopole or dipole, minimizing interference from a printed circuit board and allowing for tuning to a desired frequency.

SUMMARY OF THE INVENTION

The antenna is etched on a substrate which is connectible to a printed circuit board positioned within an enclosure. The antenna is formed having first and second leads with a number of bends therebetween. The first and/or second leads are connectable to a wireless transceiver on the printed circuit board. The antenna may be tuned to a desired frequency and used in conjunction with the transmitter to transmit a signal from or related to the device. The antenna may also receive signals from a user for controlling or polling the device.

BRIEF DESCRIPTION OF THE DRAWINGS

FIG. 4B illustrates a side view of the sensor assembly of FIG. 1A when separated from the door jamb;

FIG. 4C illustrates a front view of the sensor assembly of FIG. 1B;

DETAILED DESCRIPTION

Figure 1:
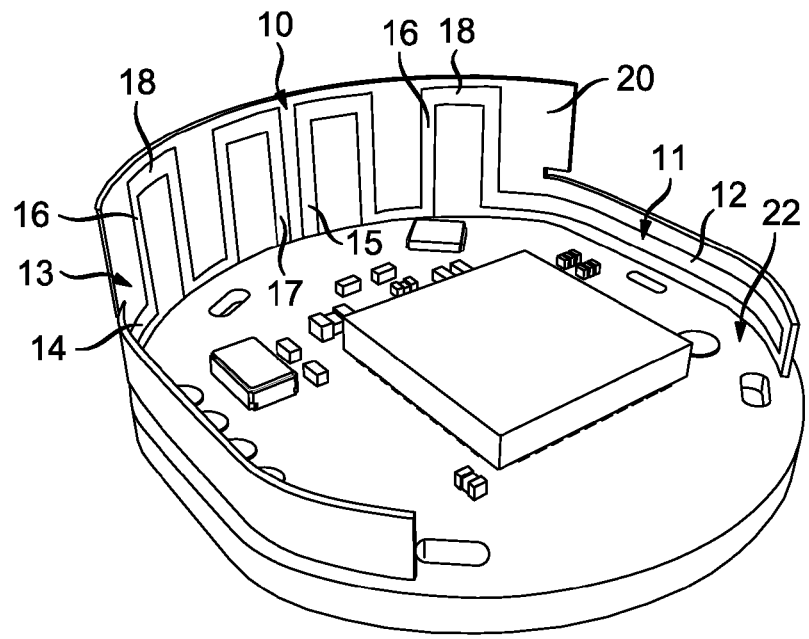
FIG. 1 illustrates a dipole antenna according to a preferred embodiment connected to a printed circuit board.

FIG. 1 illustrates a dipole antenna 10 according to a preferred embodiment for use in a constrained or compact enclosure for receiving information for and transmitting information from or concerning a device within the enclosure. The antenna 10 is etched onto a substrate 20 connected to and extending from a printed circuit board 22. The dipole antenna 10 includes a first lead 12 for a first pole 11 of the dipole antenna 10 and a first lead 14 for a second pole 13 of the dipole antenna 10. The first lead 12 for the first pole 11 of the dipole antenna 10 and the first lead 14 for the second pole 13 of the dipole antenna 10 each extend along opposing sides of the substrate 20. A second lead 15 of the first pole 11 and a second lead 17 of the second pole 13 extend below the printed circuit board 22 for connection to a transceiver T1, discussed hereinafter, on the printed circuit board 22. Positioned between the first and second leads 12, 15 and 14, 17 of each of the first and second poles are a plurality of vertical members 16 and a plurality of horizontal members 18. The plurality of vertical members 16 and plurality of horizontal members 18 connect in alternating fashion forming a continuous path between the first and second leads. The plurality of vertical members 16 extend in parallel and are spaced from one another between the first lead 12, 14 and the second lead 15, 17 of each of the corresponding first and second poles. The plurality of horizontal members 18 each connect a respective pair of adjacent vertical members together to form a continuous path between the first and second leads 12, 14 and 15, 17 of each of the corresponding first and second poles. A first vertical member may be connected at a first end either directly or through a connection with a horizontal member to the first lead 12, 14. A first end of one of the plurality of horizontal members may be connected between a second end of the first vertical member and a second end of an adjacent vertical member. Another of the plurality of horizontal members may be connected between a first end of the adjacent vertical member and a first end of a further vertical member. This pattern continues to form a continuous path between the first and second leads as shown in FIG. 1. When connected in this manner, the resulting antenna has a form similar to a meandering oscillatory shape such as a square wave pattern. A bend is formed at each connection between a vertical member and horizontal member. The bend preferably forms a substantially right angle, e.g. between 80°-100°, although the angle between vertical and horizontal members may be anywhere between substantially 0° and 180°. As electrons accelerate when they change direction, each of the bends of the antenna through which the electrons must travel adds to the acceleration resulting in increased radiation and thus an increased transmission range for the antenna. The number of vertical members and horizontal members and thus the number of bends forming the antenna is dependent on the size of the enclosure and the size of a substrate able to fit within the enclosure. Additionally, the length of the vertical and horizontal members may be increased or decreased in order to include a predefined number of bends forming the antenna having a size able to fit within a desired enclosure. Preferably, the antenna will be of a size able to fit within the enclosure and having a maximum number of bends. Performance of the antenna may also be improved by maximizing the number of bends. The length of the antenna is preferably selected based on being a quarter-wavelength of the carrier frequency; in the exemplary case the carrier frequency used was 2.4 GHz. However, any method for selecting the length of the antenna which achieves the desired results may be used. A preferred total path length for the antenna is substantially equal to ½ the transmit and receive wavelength.

The substrate 20 on which the antenna 10 is etched is shown extending perpendicular to the printed circuit board 22. However, the substrate 20 may extend at any angle from the printed circuit board 22 able to raise the antenna from the printed circuit board. The angle at which the substrate 20 extends may be dependent on the size and dimensions of the enclosure. The substrate 20 on which the antenna 10 is etched raises the antenna away from the printed circuit board 22 allowing for improved transmission and reception of signals over chip antennas. The antenna is described as being etched on the substrate. However, any manner of attaching the antenna to the substrate may be used.

The antenna 10 may be preferably developed for 2.4 GHz-carrier frequency operation. However, the antenna can be tuned to any desired frequency. The substrate is preferably a flex FR4 substrate. The Flex FR4 substrate is flexible and thus can be bent to conform to the shape of the printed circuit board to which it is connected. However, any substrate able to be bent and shaped to fit within a small tight space may be used. The substrate should also have a thickness sufficient for allowing the antenna to be etched thereon. The forming of the antenna in the meandering oscillatory shape such as a square wave pattern allows for elongation of the antenna resulting in an increased transmission range. The flexibility of the substrate and its connection to the printed circuit board allows the antenna to be fit into a constrained enclosure that would otherwise only allow for a chip antenna or physically short antenna that, disadvantageously, may not be amenable for being tuned to a desired frequency. The substrate is able to raise the antenna away from the circuit board thus minimizing interference with elements on the circuit board. This allows for improved transmission and reception of signals over that possible with conventional chip antennas 10. Measurements have shown an increase in transmission and reception range from a factor of 1.9 to a factor of 3.0 over conventional chip antennas.

The antenna 10 was preferably developed for 2.4 GHz carrier frequency operation utilized on a flex FR4 substrate. However, the antenna 10 can operate at any desired frequency and etched on any flexible substrate able to fit within the desired enclosure and connect with a printed circuit board. The antenna 10 provides an increase range over chip antennas using Bluetooth Low-Energy and Zigbee transceivers. Additionally, the printed circuit board can be of any shape able to fit in the desired enclosure and the substrate and thus the antenna can be bent to the shape of the printed circuit board to which it is attached thus adding to the usefulness of the antenna.

Figure 2:
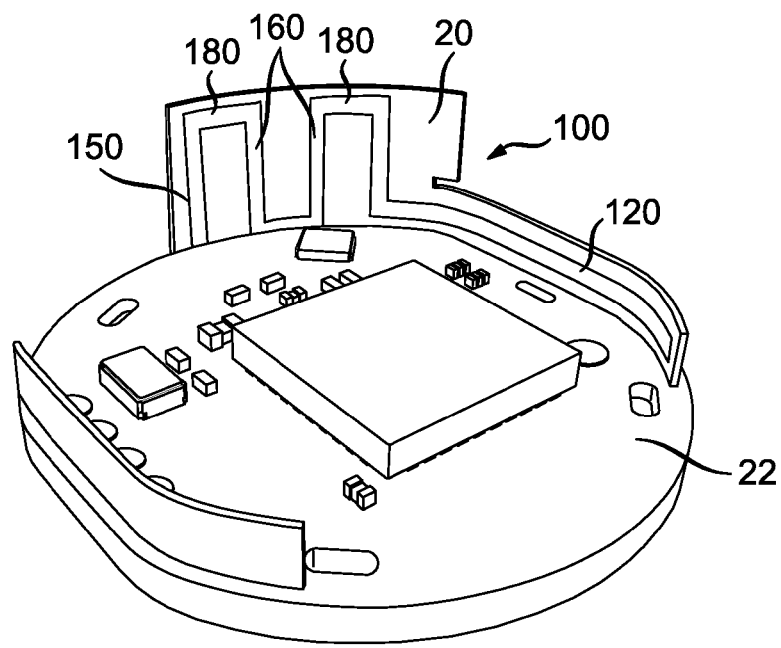
FIG. 2 illustrates a monopole antenna according to a preferred embodiment connected to a printed circuit board.

FIG. 2 illustrates a monopole antenna 100 according according to a preferred embodiment for use in a constrained or compact enclosure for receiving information for and transmitting information from or concerning a device within the enclosure. The antenna 100 is etched onto a substrate 20 connected to and extending from a printed circuit board 22. The monopole antenna 100 includes a first lead 120. A second lead 150 extends below the printed circuit board 22 for connection to a transceiver on the printed circuit board 22. Positioned between the first and second leads 120, 150 are a plurality of vertical members 160 and a plurality of horizontal members 180. The plurality of vertical members 160 and plurality of horizontal members 180 connect in alternating fashion forming a continuous path between the first and second leads 120,150. The plurality of vertical members 160 extend in parallel and are spaced from one another between the first lead 120 and the second lead 150. The plurality of horizontal members 180 each connect a respective pair of adjacent vertical members together to form a continuous path between the first and second leads 120 and 150. A first vertical member may be connected at a first end either directly or through a connection with a horizontal member to the first lead 120. A first end of one of the plurality of horizontal members may be connected between a second end of the first vertical member and a second end of an adjacent vertical member. Another of the plurality of horizontal members may be connected between a first end of the adjacent vertical member and a first end of a further vertical member. This pattern continues to form a continuous path between the first and second leads as shown in FIG. 2. When connected in this manner, the resulting antenna has a form similar to a square wave pattern. A bend is formed at each connection between a vertical member and horizontal member. The bend preferably forms a substantially right angle, e.g. between 80°-100°, although the angle between vertical and horizontal members may be anywhere between substantially 0° and 180°. As electrons accelerate when they change direction, each of the bends of the antenna through which the electrons must travel add to the acceleration resulting in increased radiation and thus an increased transmission range for the antenna. The number of vertical members and horizontal members and thus the number of bends forming the antenna is dependent on the size of the enclosure and the size of a substrate able to fit within the enclosure. Additionally, the length of the vertical and horizontal members may be increased or decreased in order to include a predefined number of bends forming the antenna having a size able to fit within a desired enclosure. Preferably, the antenna will be of a size able to fit within the enclosure and having a maximum number of bends. Performance of the antenna may be further improved by maximizing the number of bends. The total path length of the antenna is preferably selected based on being a half-wavelength of the carrier frequency; in the exemplary case the carrier frequency used was 2.4 GHz, which is common practice in antenna design. However, any method for selecting the length of the antenna which achieves the desired results may be used.

The substrate 20 on which the antenna 100 is etched is shown extending perpendicular to the printed circuit board 22. However, the substrate 20 may extend at any angle from the printed circuit board 22 able to raise the antenna from the printed circuit board. The angle at which the substrate 20 extends may be dependent on the size and dimensions of the enclosure. The substrate 20 on which the antenna 100 is etched raises the antenna away from the printed circuit board 22 allowing for improved transmission and reception of signals over chip antennas. The antenna is described as being etched on the substrate. However, any manner of attaching the antenna to the substrate may be used.

The antenna 100 may be preferably developed for 2.4 GHz-carrier frequency operation. However, the antenna can be tuned to any desired frequency. The substrate is preferably a flex FR4 substrate. The flex FR4 substrate is flexible and thus can be bent to conform to the shape of the printed circuit board to which it is connected. However, any substrate able to be bent and shaped to fit within a small tight space may be used. The substrate should also have a thickness sufficient for allowing the antenna to be etched thereon. The forming of the antenna in the shape of a meandering oscillatory shape such as the square wave pattern allows for elongation of the antenna resulting in an increased transmission range. The flexibility of the substrate and its connection to the printed circuit board allows the antenna to be fit into a constrained enclosure that would otherwise only allow for a chip antenna or physically short antenna that, disadvantageously, may not be amenable for being tuned to a desired frequency. The substrate is able to raise the antenna away from the circuit board thus minimizing interference with elements on the circuit board. This allows for improved transmission and reception of signals over that possible with conventional chip antennas. Measurements have shown increase in transmission and reception range from a factor of 1.9 to a factor of 3.0 over conventional chip antennas.

The antenna 100 was preferably developed for 2.4 GHz carrier frequency operation utilized on a flex FR4 substrate. However, the antenna can operate at any desired frequency and etched on any flexible substrate able to fit within the desired enclosure and connect with a printed circuit board. The antenna 100 provides an increase range over chip antennas using Bluetooth Low-Energy and Zigbee transceivers. Additionally, the printed circuit board can be of any shape able to fit in the desired enclosure and the substrate and thus the antenna 100 can be bent to the shape of the printed circuit board to which it is attached thus adding to the usefulness of the antenna 100.

Figure 3:
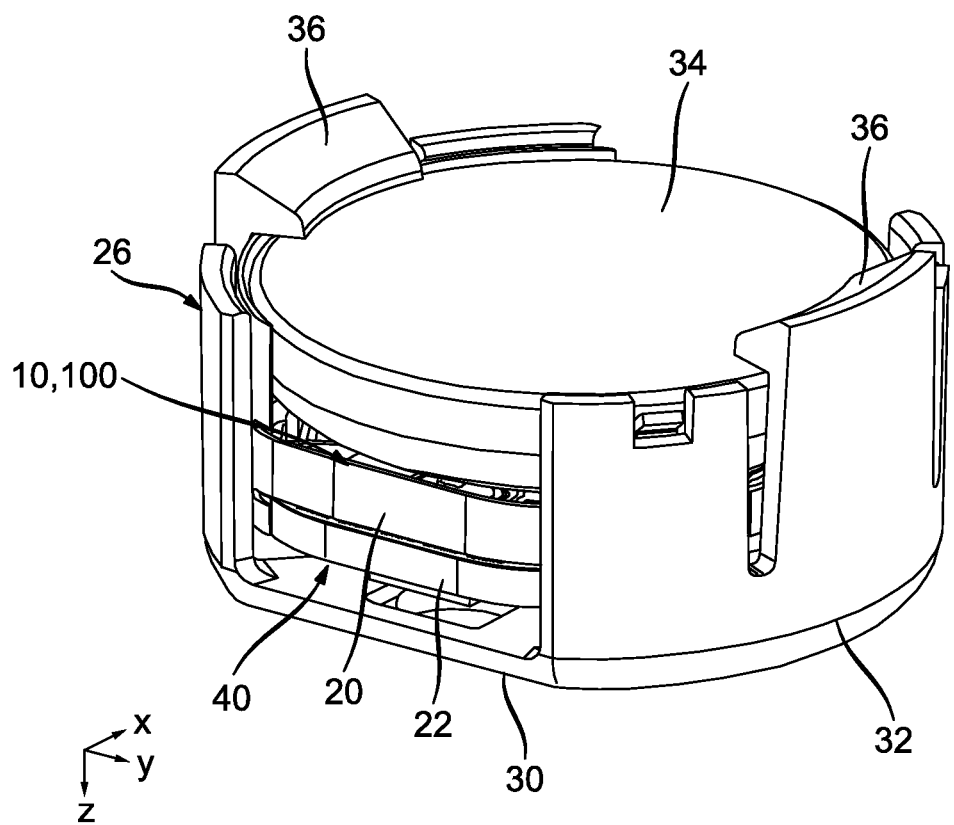
FIG. 3 illustrates the antenna connected to the printed circuit board of FIG. 1 positioned within an enclosure.

FIG. 3 shows the substrate 20 on which the antenna 10, 100 is etched and the printed circuit board 22 to which the substrate 20 is connected encased within a sensor housing 26. The sensor housing 26 is shaped to fit in the enclosure within which the device will operate. The sensor housing 26 shown in FIG. 3 includes a pool 40 in which the printed circuit board 22 and substrate 20 are seated. The pool 40 is formed by a base 30 and a wall 32 extending from and at least partially around a periphery of the base 30. Shown positioned on a side of the printed circuit board 22 opposite the base 30 is a sensor 34. The sensor 34 senses information related to the device and provides an information signal to circuitry mounted on the printed circuit board 22 for transmission via the antenna. The sensor 34, and printed circuit board 22 situated therebelow, is shown retained within the pool 40 by protrusions 36 extending from the wall 32. The protrusions 36 are shown for purposes of example only. However, any device able to retain the sensor 34, printed circuit board 22 and substrate 20 within the pool 40 may be used.

Figure 4A:
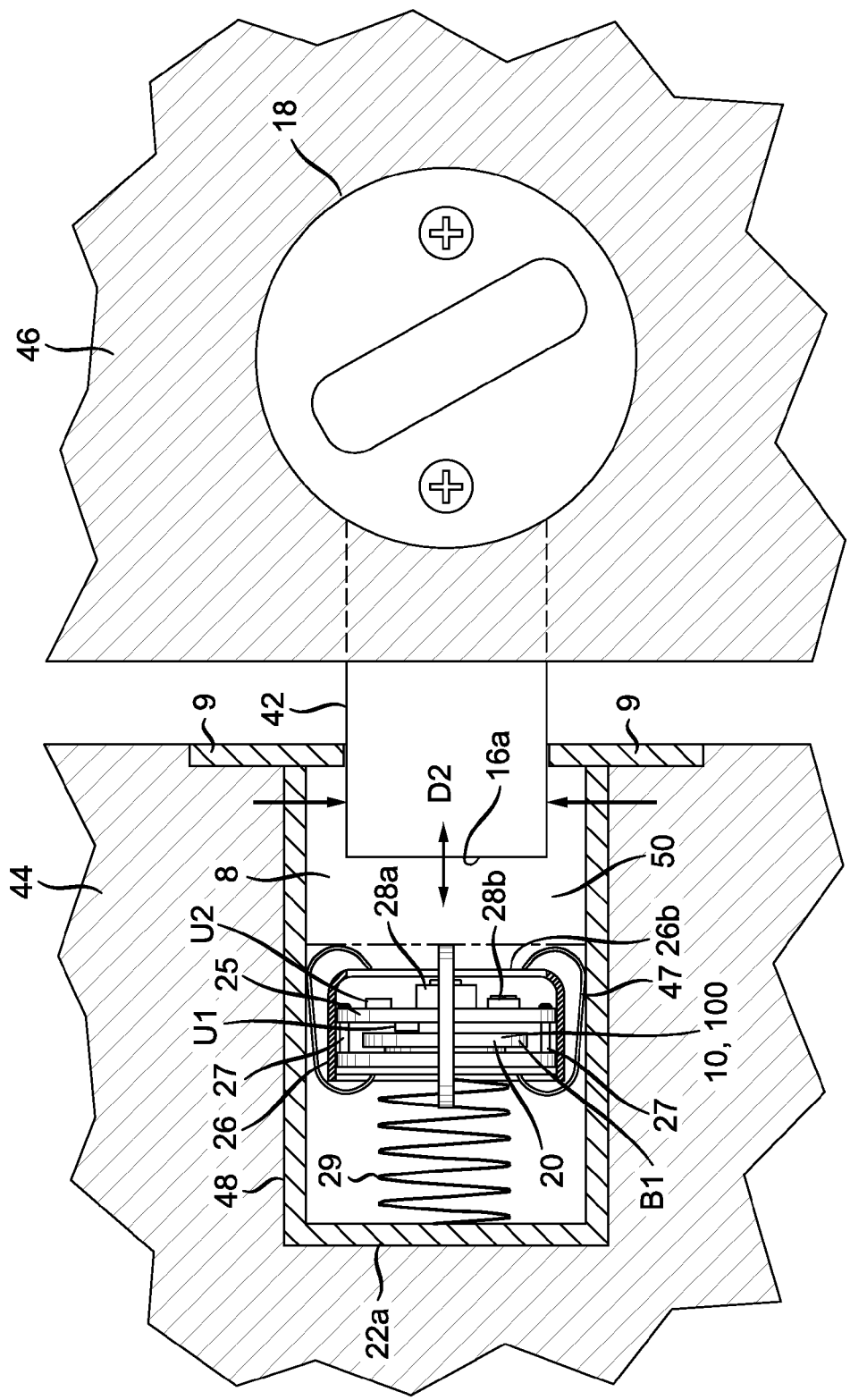
FIG. 4A illustrates a deadbolt sensor assembly according to a preferred embodiment as installed in a door jamb.

FIGS. 4A, 4B and 4C illustrate different views of a deadbolt sensor assembly 8 embodying a preferred embodiment installed in a door jamb. Deadbolt sensor assembly 8 includes a sensor capable of being disposed in a cavity formed in a frame of a door for sensing a deadbolt position to generate an output signal that is indicative of when the deadbolt position is in the cavity in a lock position and when the deadbolt position is outside the cavity in an unlock position. A wireless transmitter T1, described hereinafter, is responsive to the sensor output signal and capable of being disposed in the cavity for transmitting a wireless signal containing information derived from the output signal. The wireless transmitter is mounted on the mounting surface or printed circuit board shown in FIGS. 1 and 2. A substrate 20, as shown in FIGS. 1 and 2, extends from and is inclined to the mounting surface 22. The substrate 20 surrounds a first portion of a periphery of the mounting surface 22. A conductor 10, 100 having a meandering oscillatory shape is formed on the substrate 20 thereby maximizing the length of the conductor 10, 100. The conductor 10, 100 has a length greater than a length of a line antenna. The length of the conductor 10, 100 is dependent upon a height and width of folds forming the meandering oscillatory shape. The total path length of the conductor 10, 100 is preferably one-half the transmit and receive wavelength. The conductor 10, 100 is coupled to the transmitter to form an antenna.

FIG. 4A illustrates sensor assembly 8 and antenna according to a preferred embodiment, for use with a deadbolt 42 forming a lock in a door 46. A deadbolt housing 48 defining a deadbolt cavity 50 in a door jamb or frame 44 receives deadbolt 42, when deadbolt 42 is locked. Sensor housing 26 including sensor assembly 8 and antenna such as antenna 10, 100 of FIG. 1, 2 is also received in cavity 50 of FIG. 4A. However, instead of installing deadbolt housing 48 for forming cavity 50, door jamb 44 may be drilled out to form cavity 50. For example, it can be drilled out with ⅞ inch to 1 inch diameter spade to a depth of between 1 and ¼ inch to 1 and ½ inch. A diameter D2 of cavity 50 may range from ⅞ inch to 1 inch.

Figure 5:
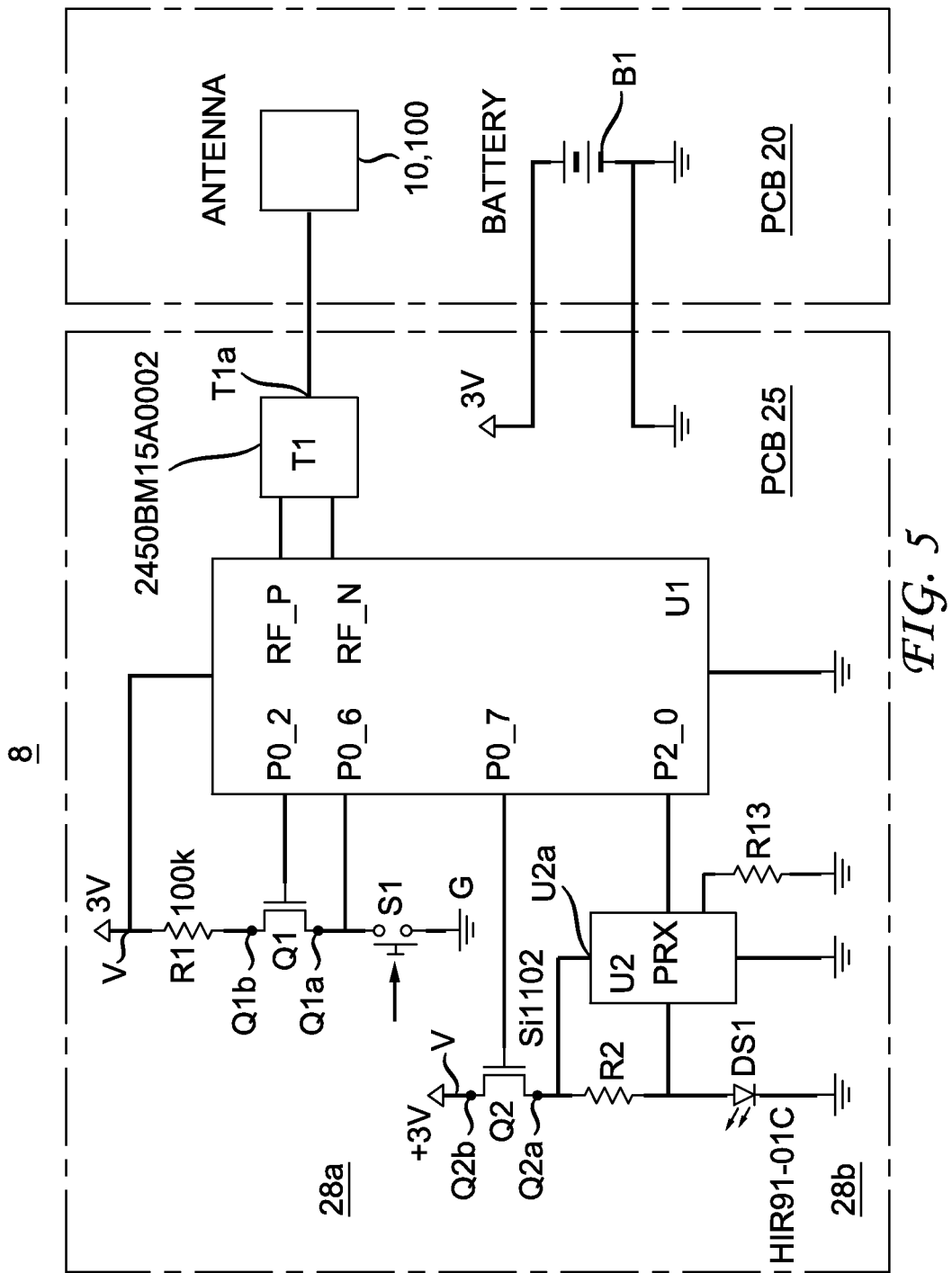
FIG. 5 illustrates a circuit diagram of the sensor assembly including the antenna according to the preferred embodiment of FIG. 1.

FIG. 5 illustrates an electrical circuit diagram for an exemplary sensor assembly 8 for use within an enclosure and connected to antenna 10, 100 of FIG. 1, 2 for transmitting signals sensed by the sensor assembly 8 of FIGS. 4A and 5. The sensor assembly 8 is received in the pool 40 of FIG. 3. Sensor assembly 8 of FIGS. 4A and 5 includes sensors 28a and 28b. Sensors 28a and 28b can be included in a manner not shown in sensor 34 of FIG. 3. Sensor 28a of FIG. 5 includes a mechanically operated plunger switch S1. Plunger switch S1 of sensor 28a is not depressed when the device being monitored by the sensor assembly is disengaged, e.g. a deadbolt for unlocking a door is disengaged. When switch S1 is not depressed, switch S1 forms a non-conductive or open circuit. Conversely, plunger switch S1 of sensor 28a is depressed when the device is engaged, e.g. a deadbolt for locking a door is engaged. When switch S1 is depressed, a current path is formed between its terminals.

A field effect transistor (FET) Q1 has a first main current conducting terminal Q1a that is coupled to a corresponding terminal of switch S1 and a second main current conducting terminal Q1b that is coupled via a pull-up resistor R1 to a supply voltage V provided by a battery B1 such as a lithium coin battery. The other terminal of switch S1 is coupled to a ground terminal G at 0V. Battery B1 has a nominal voltage of 3.0 volts.

A System on Chip (SOC) U1, such as Texas Instruments CC2541, contains a processor and a 2.4 GHz Bluetooth low energy (BLE) transmitter-receiver or transceiver, which are not shown in detail. BLE is a wireless personal area network technology. SOC U1 polls, in response to a periodic command, a port P0_6 of SOC U1. The period or frequency in which SOC U1 performs the polling operation is controlled, under normal operating conditions, by a BLE-ZigBee bridge device (not shown). Polling is accompanied in SOC U1 by applying a control voltage via a port P0_2 to a gate terminal of FET Q1 to turn on FET Q1. When turned on, FET Q1 couples pull-up resistor R1 to port P0_6. When switch S1 is depressed, switch S1 couples port P0_6 of SOC U1 to ground terminal G. Consequently, a voltage of 0V is sensed at port P0_6 when SOC U1 polls port P0_6. The voltage of 0V, sensed at port P0_6 by the processor of SOC U1, is indicative of the device being engaged, e.g. a deadbolt being engaged to lock a door.

Advantageously, FET Q1 is turned on to activate detection of the status of switch S1 only, during periodic intervals, when the aforementioned polling occurs. At other times FET Q1 is turned off. This mode of operation is utilized in order to reduce discharge or depletion of battery B1. This feature is particularly important because battery B1 is not connected to any battery charger. Yet, battery B1 is required to serve for a long time without a need for frequent replacement service. If switch S1 was turned on for as long as the device is in an engaged position, there would be an undesirable constant draw, for example, of approximately 30 micro-amps from battery B1 via resistor R1.

As indicated before, switch S1 is not depressed when the device is in a disengaged position, e.g. unlocking the door. When not depressed, switch S1 is non-conductive. Therefore, FET Q1 couples port P0_6 to battery B1 voltage V of 3V via pull-up resistor R1. Thus, SOC U1 sensing the presence of battery B1 voltage V at port P0_6 is indicative the device being in a disengaged position.

Advantageously, redundant sensor 28b utilizes an infrared (IR) proximity detector U2. Sensor 28b facilitates an error detection feature. An FET Q2 has a first main current conducting terminal Q2a that is coupled both to a supply terminal U2a of proximity detector U2 and to a current limiting resistor R2. A second main current conducting terminal Q2b of FET Q2 is coupled to supply voltage V of battery B1. SOC U1 applies a voltage to a port P0_7 that is coupled to a gate terminal of FET Q2 to turn on FET Q2 for performing polling operation in proximity detector U2. Similarly to FET Q1, FET Q2 is turned on to activate the detection associated with proximity detector U2 only when the aforementioned polling occurs in sensor 28b. At other times, FET Q2 is turned off. This mode of operation that is similar to that applicable to FET Q1 is utilized in order to reduce discharging battery B1.

Optical proximity detector U2 operates in cooperation with an IR light emitting diode (LED) DS1. LED DS1 is driven via current limiting resistor R2 by FET Q2, when FET Q2 is turned on for polling an output signal PRX of detector U2.

Optical proximity detector U2 is an active optical reflectance proximity detector with an on/off digital output whose state is based upon the comparison of reflected IR light against a set threshold. LED DS1 produces light pulses at a strobe frequency of, for example, 2.0 Hz, of which reflections from an element of the device being monitored, e.g. a front face of a deadbolt, reach a photodiode, not shown, of proximity detector U2 and are processed by proximity detector U2 analog circuitry, not shown. The rate detector U2 detecting the proximity of the element of the device being monitored is controlled by a resistor R13. The average current drawn by detector U2 in this exemplary embodiment is 5 micro-amps with proximity detection frequency of 2.0 Hz. A resulting most recent or current state of the detected proximity is developed at output signal PRX of detector U2 that is polled by port P2_0 of SOC U1. If the reflected light is above the detection threshold, proximity detector U2 asserts an active-LOW output signal PRX to indicate the device is engaged, e.g. the deadbolt is in a locked position. Conversely, if the reflected light is below the detection threshold, proximity detector U2 of FIG. 2 asserts a HIGH output signal PRX to indicate the device is disengaged, e.g.

the deadbolt is in an unlocked position. The output signals are provided to a transceiver T1 for transmission to a user via antenna 10, 100.

A pair of terminals RF_P and RF_N of SOC U1 communicates Radio Frequency (RF) modulated signals transmitted/received by the BLE transceiver, not shown, of SOC U1 in accordance with the BLE protocol. Terminals RF_P and RF_N of SOC U1 are coupled to a corresponding pair of terminals, respectively, of an Impedance Matched RF Front End Differential Balun-Low Pass Filter integrated passive component T1. An output terminal of integrated passive component T1 is coupled to antenna 10, 100 for transmitting/receiving the RF signal associated with the BLE transceiver of SOC U1.

Figure 6A:
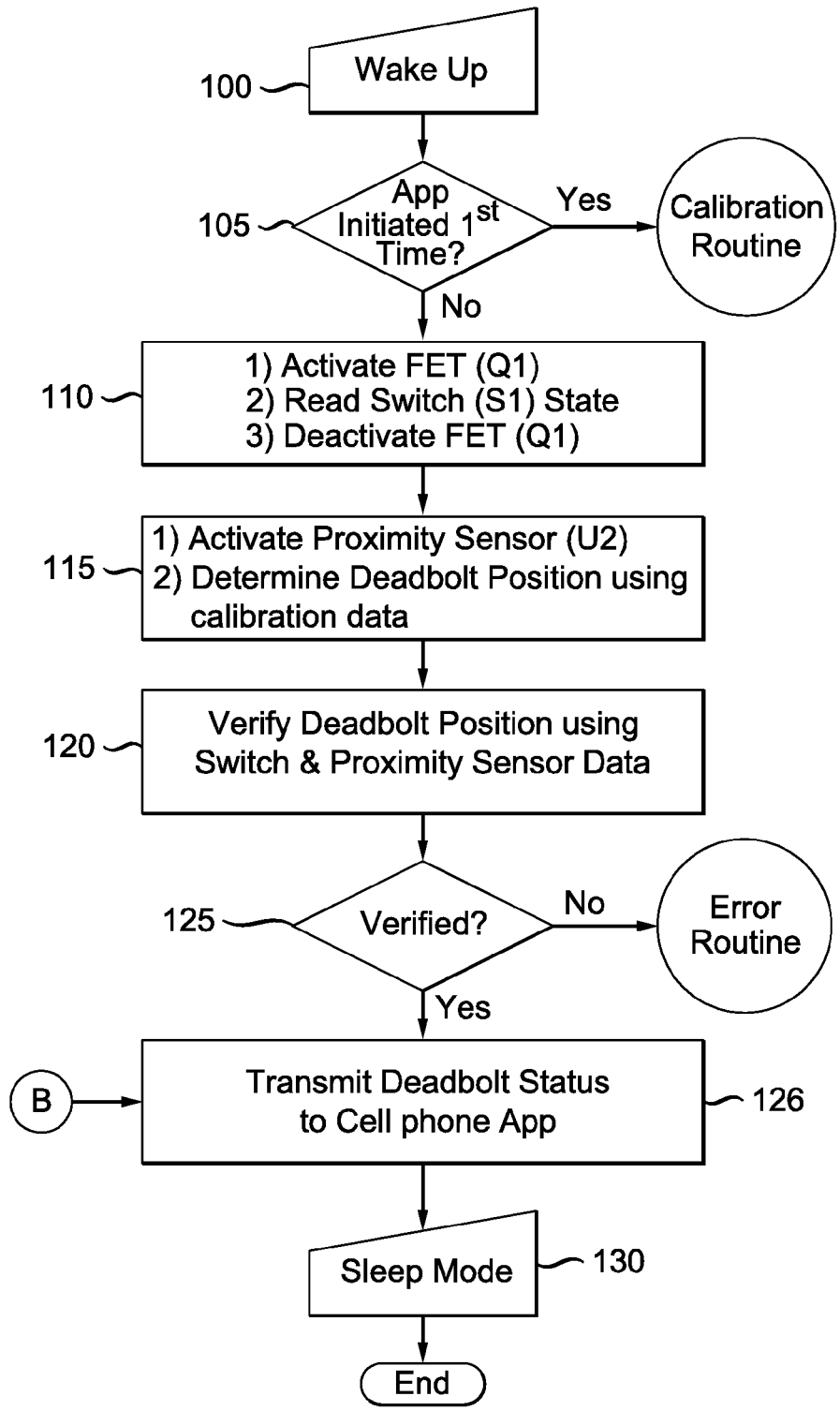
FIGS. 6A, 6B and 6C illustrate corresponding flow charts associated with the sensor assembly of FIG. 5.
Figure 6B:
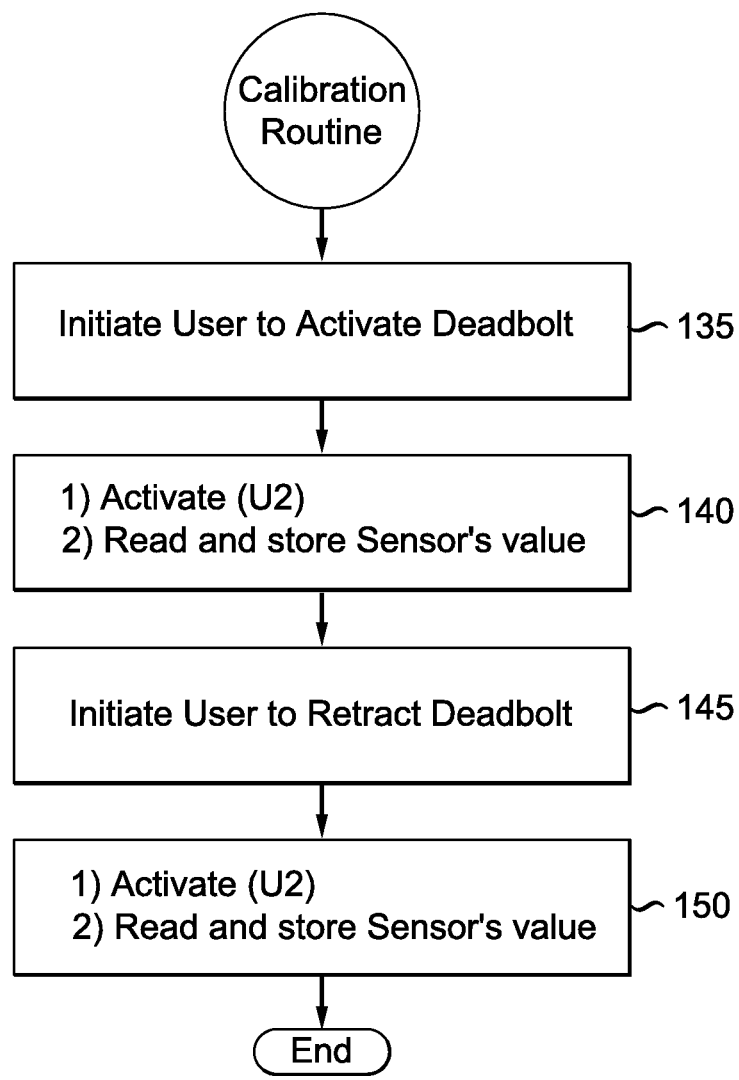
Figure 6C:
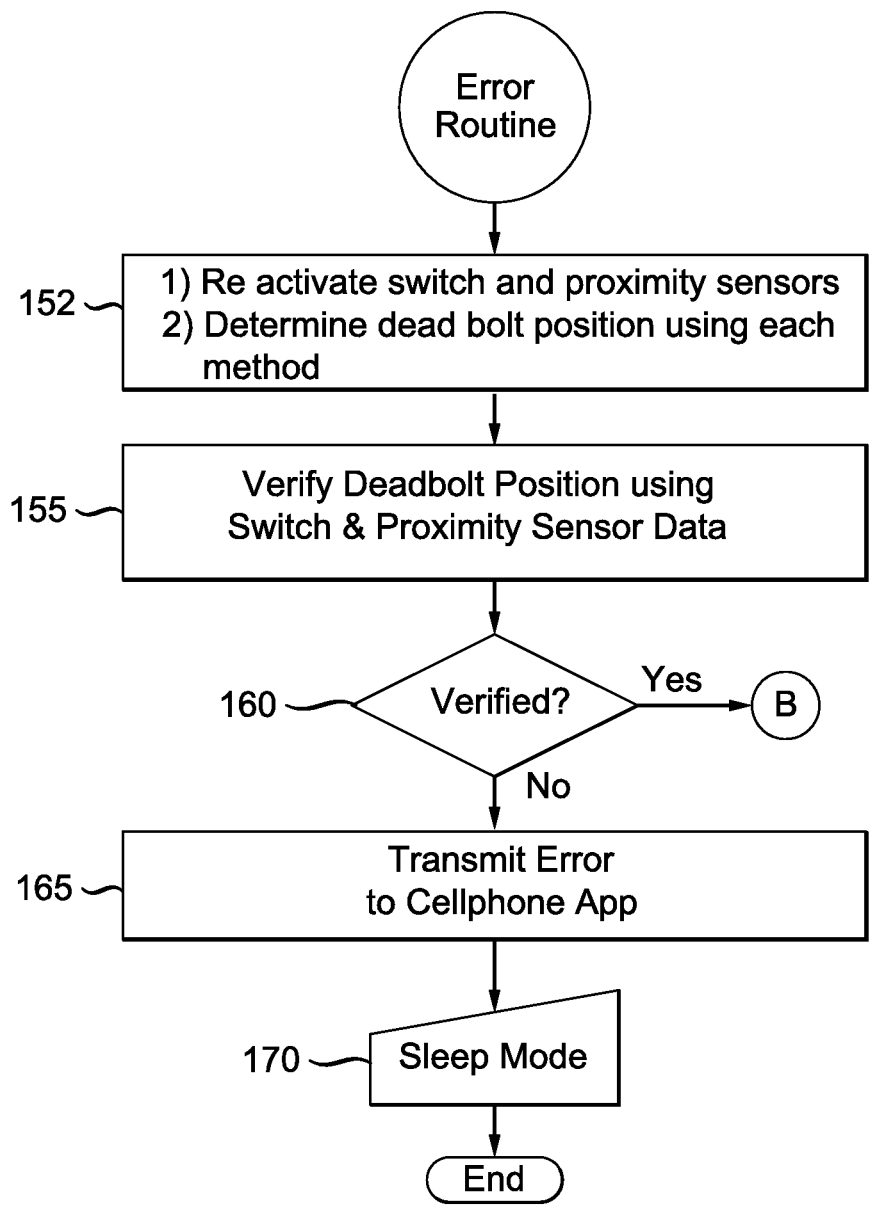

FIGS. 6A, 6B and 6C provide flow charts useful for explaining the operation of sensor assembly 8 of FIG. 5 for transmission of signals using antenna 10, 100. Similar symbols and numerals in FIGS. 5, 6A, 6B and 6C indicate similar items or functions. Except as otherwise noted, sensor assembly 8 of FIG. 5 participates in each step referred to in FIGS. 6A, 6B and 6C. The flow charts of FIGS. 6A, 6B and 6C show use of the antenna 10, 100 with a sensor assembly 8 for sensing the position of a deadbolt. However, this operation is shown for purposes of example only and, in practice, the antenna of the present arrangement may be used to sense, control or monitor conditions and activities of any device positioned within an enclosure.

Under normal operation, a periodic command referred to in more detail later on, may be transmitted using a BLE wireless signal initiated, for example, in a BLE-ZigBee bridge device and received by the BLE transceiver of SOC U1 via antenna 10, 100. Upon the occurrence of the aforementioned periodic command, SOC U1, operating in a so-called Sleep Mode prior to the occurrence of the aforementioned periodic command, performs a so-called Wake Up step 100 of the flow chart of FIG. 6A. Next, SOC U1 tests in a step 105 whether SOC U1 has been initiated for the first time. If it had been initiated before, then SOC U1, in a step 110, turns on or activates FET Q1 for activating status checking of the deadbolt by SOC U1 polling port P0_6 that reads the state of switch S1. After polling port P0_6, SOC U1 deactivates FET Q1.

Next, SOC U1, in a step 115, turns on or activates FET Q2 for checking the status of proximity detector U2 by reading output signal PRX developed at port P2_0. Subsequently, in a step 120, the reading of proximity detector U2 output signal PRX is compared in the processor, not shown, of SOC U1 with the reading of the previously obtained state of switch S1 for providing error checking that is performed in a processor, not shown, of SOC U1. If the readings are consistent or verified in a step 125, then, in a step 126 that is performed by a BLE-ZigBee bridge device, the state of the deadbolt, locked or unlocked, is transmitted via antenna 10, 100. Afterwards, in a step 130, SOC U1 returns to the so-called Sleep Mode.

If at step 105, it is determined that SOC U1 has been initiated for the first time, BLE-ZigBee bridge device 306 transmits a message via antenna 10, 100, in a step 135 of a calibration routine as shown in FIG. 6B, requesting the user activate deadbolt assembly 8. Activation of deadbolt assembly 8 is performed by changing its current state, lock or unlock, to the other state. Then, SOC U1 in a step 140 polls each of port P0_6 and port P2_0 and stores the state of each of switch S1 and IR detector U2. Next, in a step 145, SOC U1 transmits a message to a user located next to the deadbolt requesting the user to change the state of deadbolt from its preceding locked or unlocked state to the opposite state. Following the changing of the state of deadbolt, SOC U1, in a step 150, polls each of port P0_6 and port P2_0 and stores the state of each of switch S1 and IR detector U2. This calibration process is used to confirm that each switch S1 and proximity detector U2 do indeed change state in response to the change of state of the deadbolt.

If the processor, not shown, in SOC U1, at step 125 of FIG. 6A, determines that an error has occurred, SOC U1 initiates an error routine shown in the flow chart of FIG. 6C. In a step 152, SOC U2 reactivates FET Q1 for reading at port P0_6 the state of switch S1 and reactivates FET Q2 for reading the status of proximity detector U2 by reading output signal PRX at port P2_0. Next, in a step 155, the reading of proximity detector output signal PRX is compared to the reading of the state of switch S1. If the readings are consistent or verified, in a step 160, then step 126 of FIG. 6A follows. Otherwise, BLE-ZigBee bridge device transmits an error message in a step 165. Next, in a step 170, SOC U1 returns to the so-called Sleep Mode.

Other than antenna 10, 100 and battery B1, the rest of the circuitry of sensor assembly 8 that is depicted in FIGS. 4A, 4B and 4C is mounted on a first printed circuit board (PCB) 25. The antenna 10, 100 is mounted to a second PCB or substrate 20 as discussed with respect to FIGS. 1, 2 and 3. Battery B1 and antenna 10, 100 are shown mounted on the second PCB 20 that is connected to PCB 25 using pin standoffs or clips. However, the battery B1 may be connected to the printed circuit board by any known manner. In the present exemplary embodiment, PCB 25, PCB 20 and pin standoffs are contained in sensor housing 26 to form a structure having a length dimension, measured in the direction of the movement of deadbolt, of approximately ⅓ inch. Sensor housing 26 has an opening 26b for enabling deadbolt 42 to contact plunger switch S1 of FIG. 5 of sensor 28a of FIG. 4A when deadbolt 42 is engaged for locking door 46.

As shown in FIG. 4A, a spring 29 has an end portion, remote from PCB 20, which makes a sliding contact, without being fastened or immobilized, to a back wall 48a of housing 48. Spring 29 has an opposite end that is mechanically attached to PCB 20. Thus, spring 29 is interposed between sensor assembly 8 and back wall 48a. As explained later on, during installation, spring 29 and the structure of PCB 25, PCB 20 and pin standoffs 27 are manually pushed into cavity 50 to remain there indefinitely.

The deadbolt should, preferably, have sufficient clearance relative to plunger switch S1 of FIG. 5 so as not to contact switch S1 when deadbolt is unlocked. Also, the deadbolt, preferably, should be able to contact plunger switch S1 of FIG. 5 without causing the spring 29 to be fully compressed when deadbolt is locked.

Advantageously, battery B1 of FIG. 5, switch S1, detector U2 and SOC U1 are disposed on the structure formed by PCB 25 and PCB 20 that is connected to spring 29 of FIG. 4B. Interposing spring 29 between wall 48a of housing 48 and the structure formed by PCB 25, PCB 20 and standoffs 27, advantageously, provides a capability to displace together battery B1, switch S1, detector U2 and SOC U1 that are entirely contained in cavity 50 of FIG. 4A. Displacing together battery B1, switch S1, detector U2 and SOC U1 of FIG. 4A is caused by the movement of deadbolt 42. The flexing capability of spring 29 compensates for a particular travel distance selected for deadbolt 42, a particular selected length of deadbolt 42 and a particular gap selected between door 46 and frame 44. The compensation is obtained by different extent of compression/expansion of spring 29 when deadbolt 42 is moved from the unlock position to the lock position, and vice versa.

Advantageously, the ability of PCB 25, PCB 20 and pin standoffs 27 to move together laterally in response to locking/unlocking deadbolt 42 by the operation of spring 29 avoids the need to adjust the position of sensor assembly 8, during installation in door frame 44. This feature makes sensor assembly 8 versatile for accommodating differences among travel distances and differences in lengths of different deadbolts similar to deadbolt 42 and also differences of corresponding gaps between a variety of door and door frame combinations such as between door 46 and door frame 44.

Advantageously, packaging battery B1, Balun-Low Pass Filter integrated passive component T, SOC U1, IR detector U2 and switch S1 on the structure formed by PCB 25, PCB 20 and pin standoffs 27 avoids the need for installing any part of moveable sensor assembly 8 externally to cavity 50. Additionally, sensor assembly 8 can be manufactured in sizes to accommodate common industry standards. Thus, sensor assembly 8 and housing 48 require minimal or no modification of pre-existing combinations of door frame, door and deadbolt.

FIG. 4B illustrates a side view of the sensor assembly 8 of FIG. 4A when it is separate from frame 44 and before being inserted into cavity 50. FIG. 4C illustrates a front view of the sensor assembly 8 of FIG. 4B. Similar symbols and numerals in FIGS. 4A, 4B, 4C, 5, 6A, 6B and 6C indicate similar items or functions.

Advantageously, sensor assembly 8 of FIG. 4A or sensor housing 26 is not firmly attached to any of the walls of cavity 50. For example, spring 29 touches wall 48*a* without being firmly attached to it. Sensor assembly 8 as shown in FIG. 4C includes a group of 4 resilient legs 47 that are evenly distributed each 90 degree angular interval around its circumference 52. Each leg 47 is formed of a flexible material to form an arc-shaped spring. When sensor assembly 8 of FIG. 4B is still not installed in cavity 50 of FIG. 4A, a curved portion of each leg 47 of FIG. 4B is tangent to circumference 52 of FIG. 4C having a center axis 49 and a diameter D1. Diameter D1 is larger than diameter D2 of cavity 50 of FIG. 4A, when sensor assembly 8 of FIG. 4B is still not installed in cavity 50 of FIG. 4A.

Advantageously, during installation, sensor assembly 8 of FIG. 4B is inserted into cavity 50 of FIG. 4A merely by a manual sliding push. Consequently, flexible legs 47 of FIG. 4B are flexed such that distance D1 of FIG. 4C contracts, in a manner not shown, and becomes equal to distance D2 of FIG. 4A.

Axis 49 of FIG. 4B also represents a direction of displacement of sensor 28*a*, for example. When sensor assembly 8 is installed inside cavity 50, each of flexible legs 47 of FIG. 4B produces a radial force, not shown, having a component in a direction perpendicular to a direction of axis 49 of FIG. 4B.

Advantageously, flexible legs 47 are capable of, advantageously, hindering sensor system 8 of FIG. 4A from falling out of or separating from cavity 50 when deadbolt 42 is in the unlock position. As indicated before, flexible legs 47 of FIG. 4B enable insertion of sensor assembly 8, during installation into cavity 50 of FIG. 4A. Thus, as explained before, installing sensor assembly 8 in cavity 50 is simply done by merely pushing it into cavity 50 that can be accomplished by substantially untrained user.

Figure 7A:
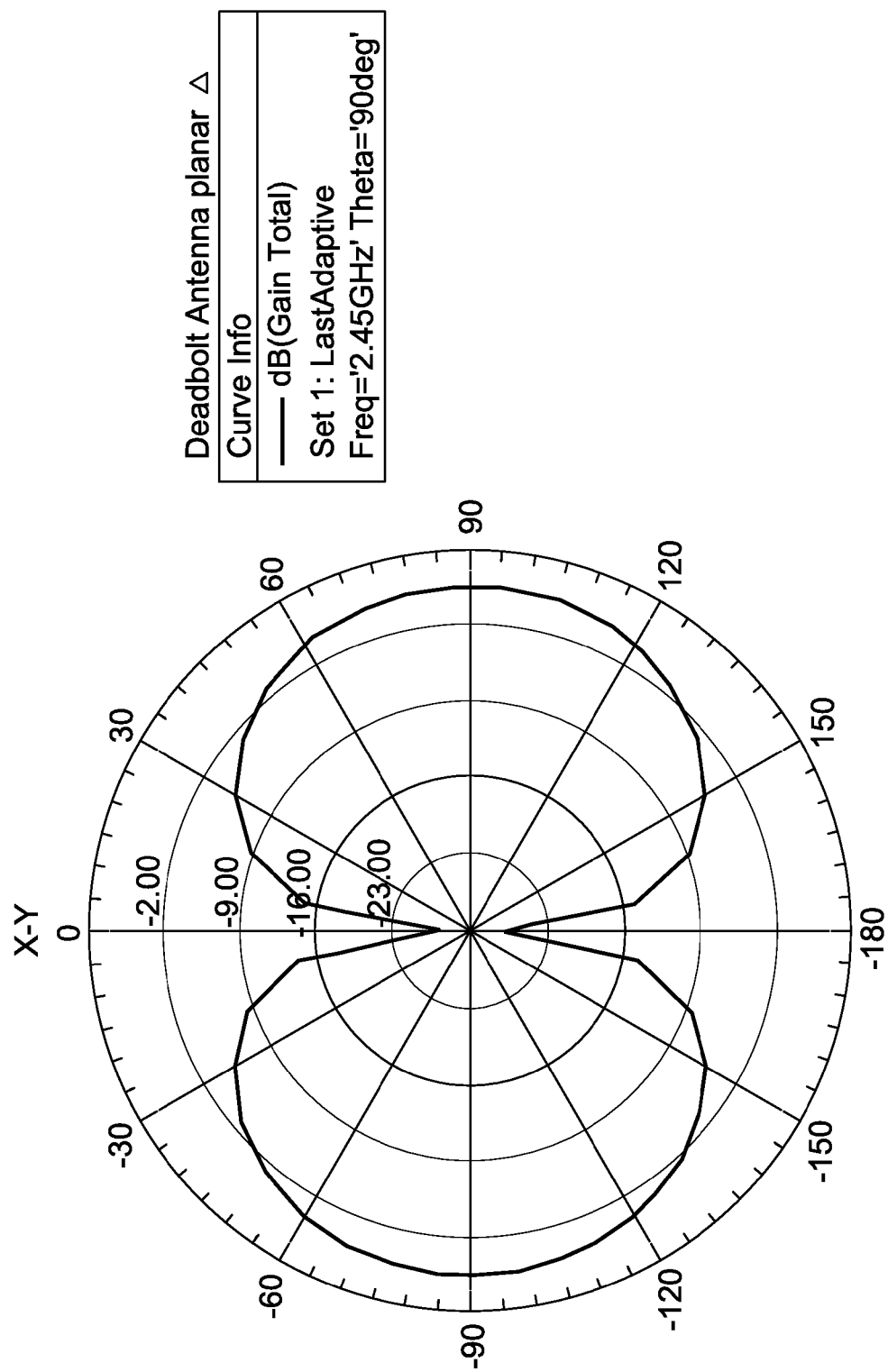
FIGS. 7A and 7B illustrate radiation pattern simulations performed using the antenna according to the preferred embodiment.
Figure 7B:
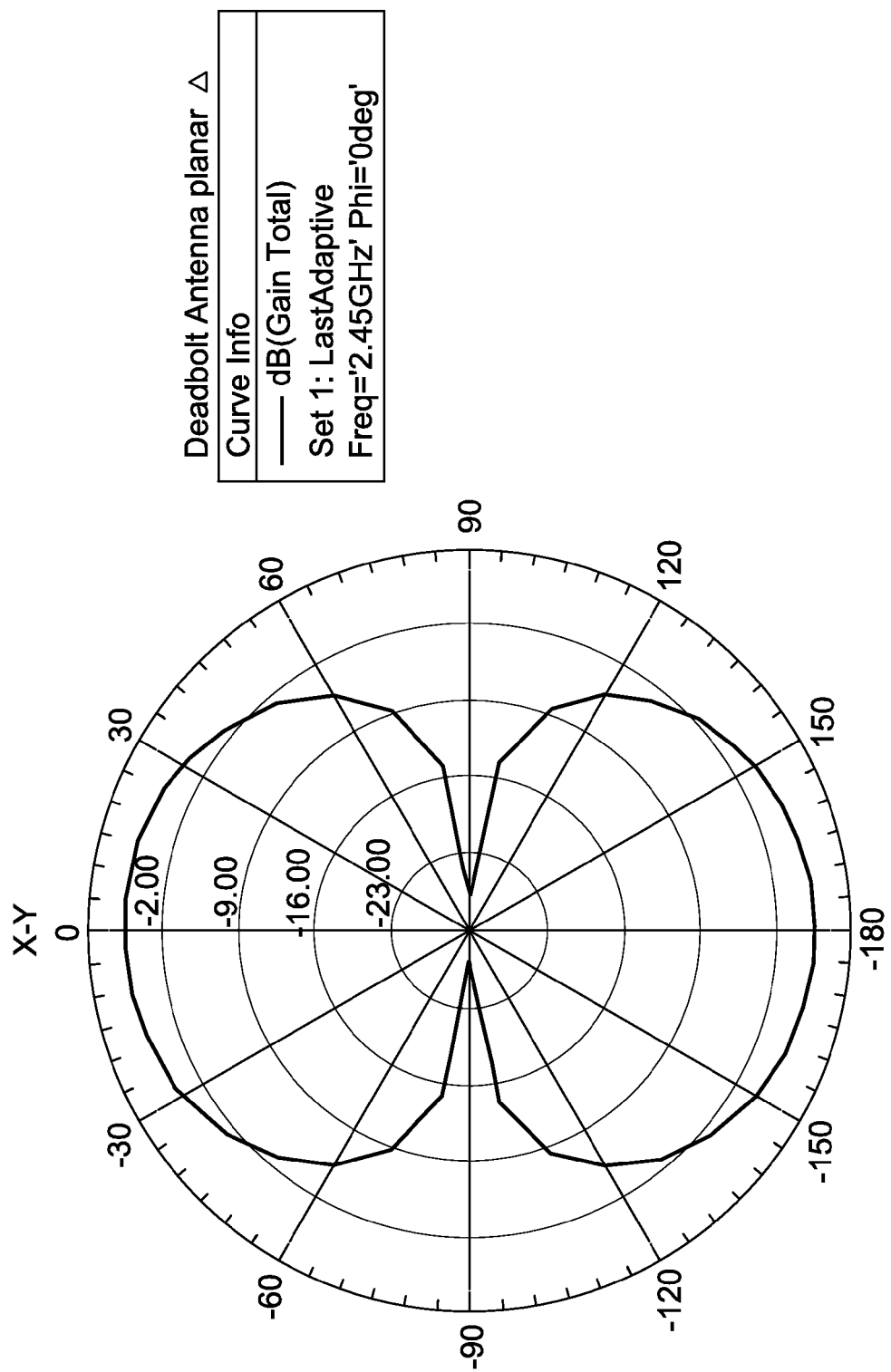

FIGS. 7A and 7B show radiation patterns measured for the antenna of the preferred embodiment. These figures show relative spatial performance and illustrate the measured range of the antenna. FIG. 7A illustrates the relative strength of the field as a function of direction along the XY plane and FIG. 7B illustrates the relative strength of the field as a function of direction along the XZ plane. As previously discussed, these figures show an increase in transmission and reception range when compared to the measured strength of a chip antenna from a factor of 1.9 to a factor of 3.0.

The invention claimed is:

1. A deadbolt sensor assembly configured to enable mounting the assembly in a cavity formed in a frame of a door, wherein the assembly comprises:
   a sensor to sense a deadbolt position to generate an output signal indicating when said deadbolt position is in said cavity in a lock position and when said deadbolt position is outside said cavity in an unlock position;
   a wireless transmitter responsive to said sensor output signal to transmit a wireless signal containing information derived from said output signal;
   a printed circuit board to which the sensor is connected;
   an antenna electrically coupled to said wireless transmitter and to a circuit mounted on said printed circuit board to transmit the wireless signal containing information derived from said sensor output signal, said antenna including:
   a first lead for connection to said wireless transmitter;
   a second lead;
   a plurality of vertical members extending in parallel to one another and spaced a predetermined distance apart, each vertical member having a first end and a second end;
   a plurality of horizontal members, each horizontal member extending alternately between first ends of a pair of adjacent vertical members and second ends of a next pair of adjacent vertical members forming a connection between said first lead and said second lead; and
   a substrate on which said first lead, said second lead, said plurality of vertical members, and said plurality of horizontal members are etched to form a square wave pattern, wherein said substrate being connected to said printed circuit board for spacing the antenna from the printed circuit board, and wherein said substrate comprises a flexible material bent to conform to a shape of said printed circuit board to enable said deadbolt sensor assembly to fit within said cavity;
   wherein the assembly further comprises a battery for energizing said wireless transmitter and said sensor, and
   wherein the antenna transmits signals from and receives signals for a device positioned within the cavity.

2. The deadbolt sensor assembly according to claim 1, wherein the antenna is formed as one of a monopole and dipole antenna.

3. The deadbolt sensor assembly according to claim 2, further comprising a housing for retaining the antenna, substrate and printed circuit board.

4. The deadbolt sensor assembly according to claim 3, wherein said plurality of vertical members and said plurality of horizontal members extend at an angle of 90° from each other.

5. The deadbolt sensor assembly according to claim 4, wherein a total path length of the antenna is one half a transmit and receive wavelength.

6. A deadbolt sensor assembly configured to enable mounting the assembly in a cavity formed in a frame of a door, wherein the assembly comprises:
   a sensor to sense a deadbolt position and generate an output signal indicating when said deadbolt position is in said cavity in a lock position and when said deadbolt position is outside said cavity in an unlock position;

a wireless transmitter responsive to said sensor output signal to transmit a wireless signal containing information derived from said sensor output signal;

a surface to mount thereon said wireless transmitter;

a substrate extending from and being inclined to said mounting surface, said substrate being flexible and bent for surrounding a first portion of a periphery of said mounting surface;

a conductor having a meandering oscillatory shape formed on said substrate, said conductor having a length greater than a length of a second portion of the periphery by a magnitude, said magnitude being dependent upon a height and width of folds forming the meandering oscillatory shape, said conductor being coupled to said wireless transmitter to form an antenna; wherein the conductor is etched on the substrate, and wherein the assembly further comprises a printed circuit board to which the sensor is connected, said substrate being connected to said printed circuit board for spacing the conductor from the printed circuit board, and a battery for energizing said wireless transmitter and said sensor.

7. The deadbolt sensor assembly according to claim 6, wherein said meandering oscillatory shape of the conductor forms a square wave pattern.

8. The deadbolt sensor assembly according to claim 7, wherein the conductor transmits signals from and receives signals for a device positioned within the cavity.

9. The deadbolt sensor assembly according to claim 8, wherein the conductor is formed as one of a monopole antenna and dipole antenna.

10. The deadbolt sensor assembly according to claim 9, wherein a total path length of the conductor is one half a transmit and receive wavelength.

* * * * *